US006332304B1

(12) United States Patent
Fuhrman

(10) Patent No.: US 6,332,304 B1
(45) Date of Patent: Dec. 25, 2001

(54) HOUSING PANELS, ENCAPSULATED, STEEL FRAMED

(76) Inventor: Conway J. Fuhrman, 7163 Santa Inez Cir., Buena Park, CA (US) 90620

( * ) Notice: Subject to any disclaimer, the term of this patent is extended or adjusted under 35 U.S.C. 154(b) by 0 days.

(21) Appl. No.: 09/599,302

(22) Filed: Jun. 22, 2000

(51) Int. Cl.$^7$ .................................................. E04B 1/16
(52) U.S. Cl. ................................. 52/745.19; 52/742.13; 52/309.7; 264/46.7
(58) Field of Search ........................... 52/745.19, 742.13, 52/742.1, 745.01, 745.1, 745.13, 309.7, 309.13, 309.16; 249/39, 170; 264/46.7, 46.4

(56) References Cited

U.S. PATENT DOCUMENTS

| | | | |
|---|---|---|---|
| 4,298,323 | * 11/1981 | Haydt, Jr. | 425/162 |
| 5,499,482 | * 3/1996 | Goff | 52/742.13 |
| 5,667,192 | * 9/1997 | Van Doren | 249/82 |
| 6,035,584 | * 3/2000 | Barreto | 52/79.1 |

FOREIGN PATENT DOCUMENTS

10131348-A * 5/1998 (JP).

* cited by examiner

*Primary Examiner*—Carl D. Friedman
*Assistant Examiner*—N. Slack

(57) ABSTRACT

A New Useful Improvement. An encapsulation method for producing high quality low cost housing panels, which uses commercially fabricated pre-assembled light gage steel framed structures, with superior insulation material. The encapsulation process uses a Clamshell Jig Fixture designed specifically for this process. The pre-assembled steel housing frames are placed in the Jig Fixture and sealed. Thereafter the insulation material is injected into the steel framework via openings in the jig fixture. The insulation material is a high density Class 1 Isofoam Polyisocyanate, known as Polyurethane. It is free of Formaldehyde and CFC's or HCFCS. Its insulation "R" factor is 7.69 per inch of thickness. Finished panels result in "R" factors to 40.37, with vertical, horrizontal, wind and seismic strengths greater than building code requirements for housing. Panel attaching methods are simpler and stronger using smaller, short, light 16 to 12 gage studs, bolts, nuts and anchor plates.

10 Claims, 4 Drawing Sheets

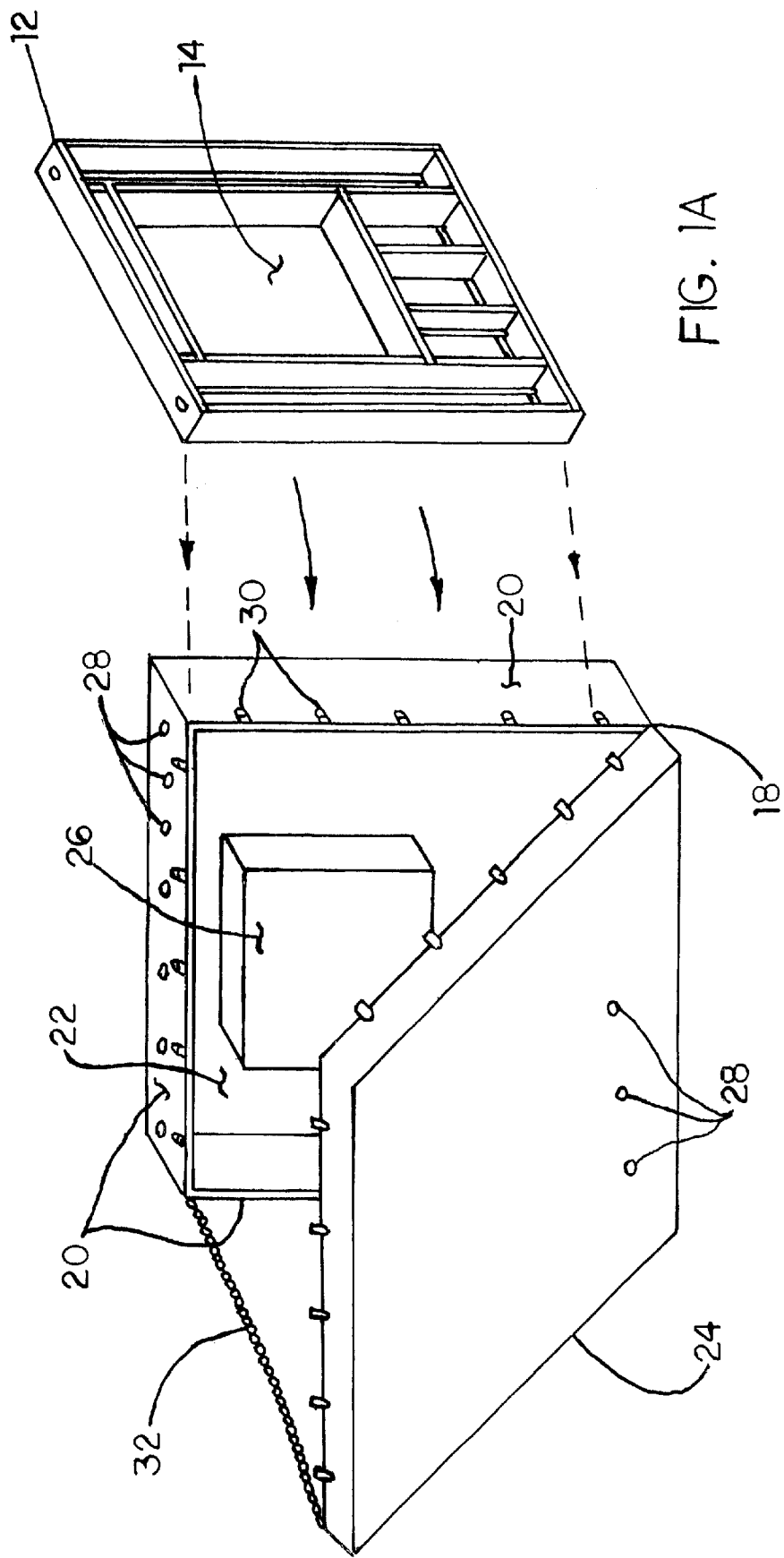

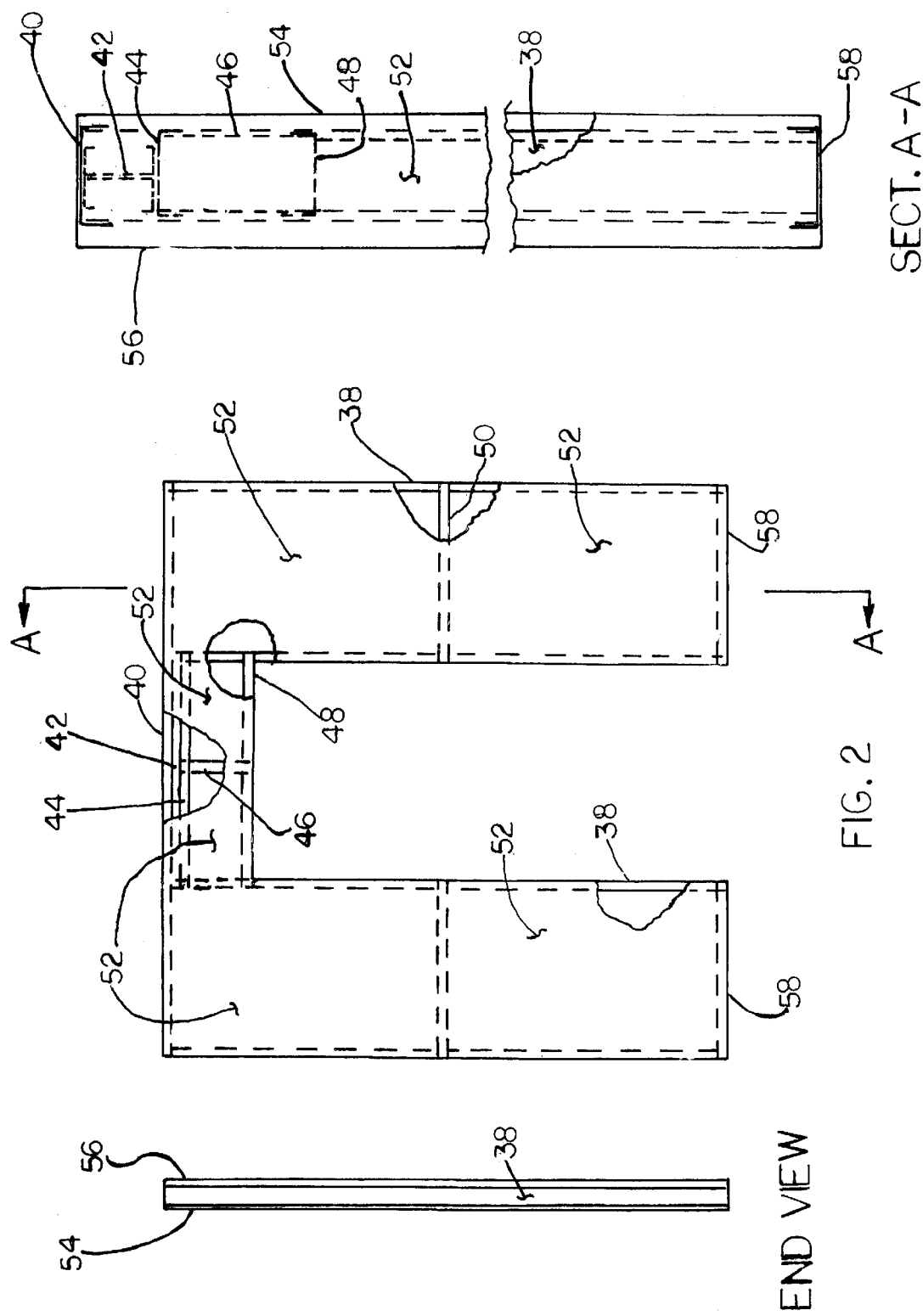

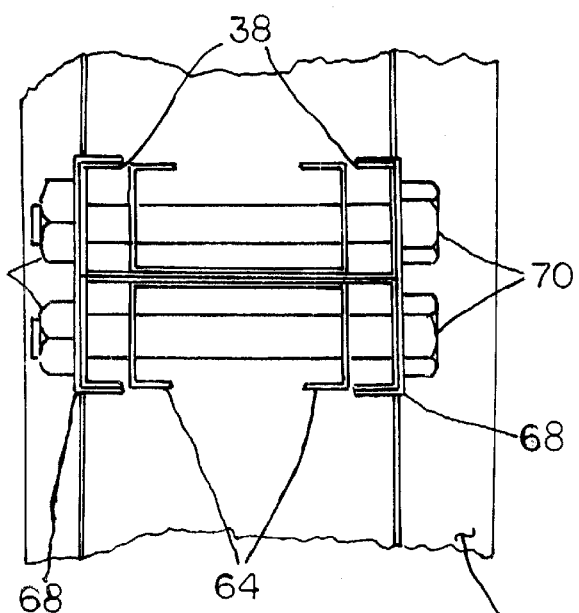
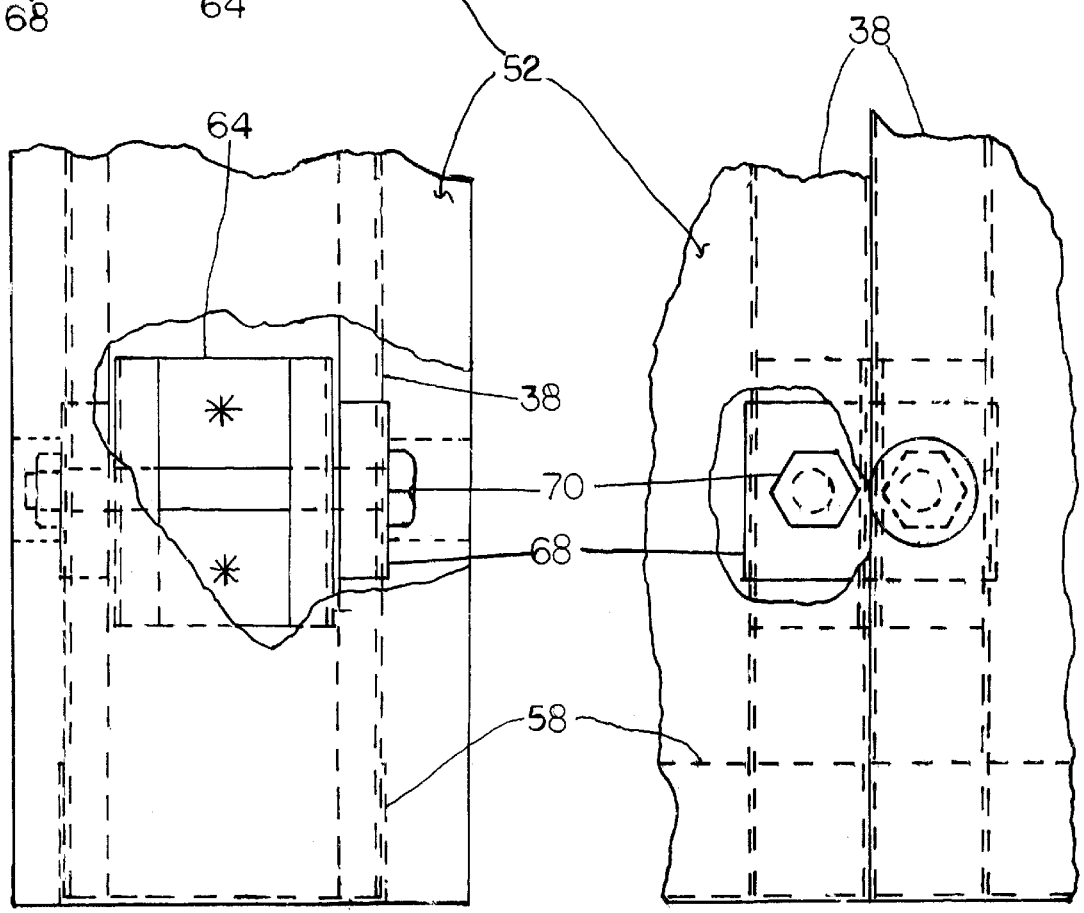
FIG. 5
FIG. 4  FIG. 3

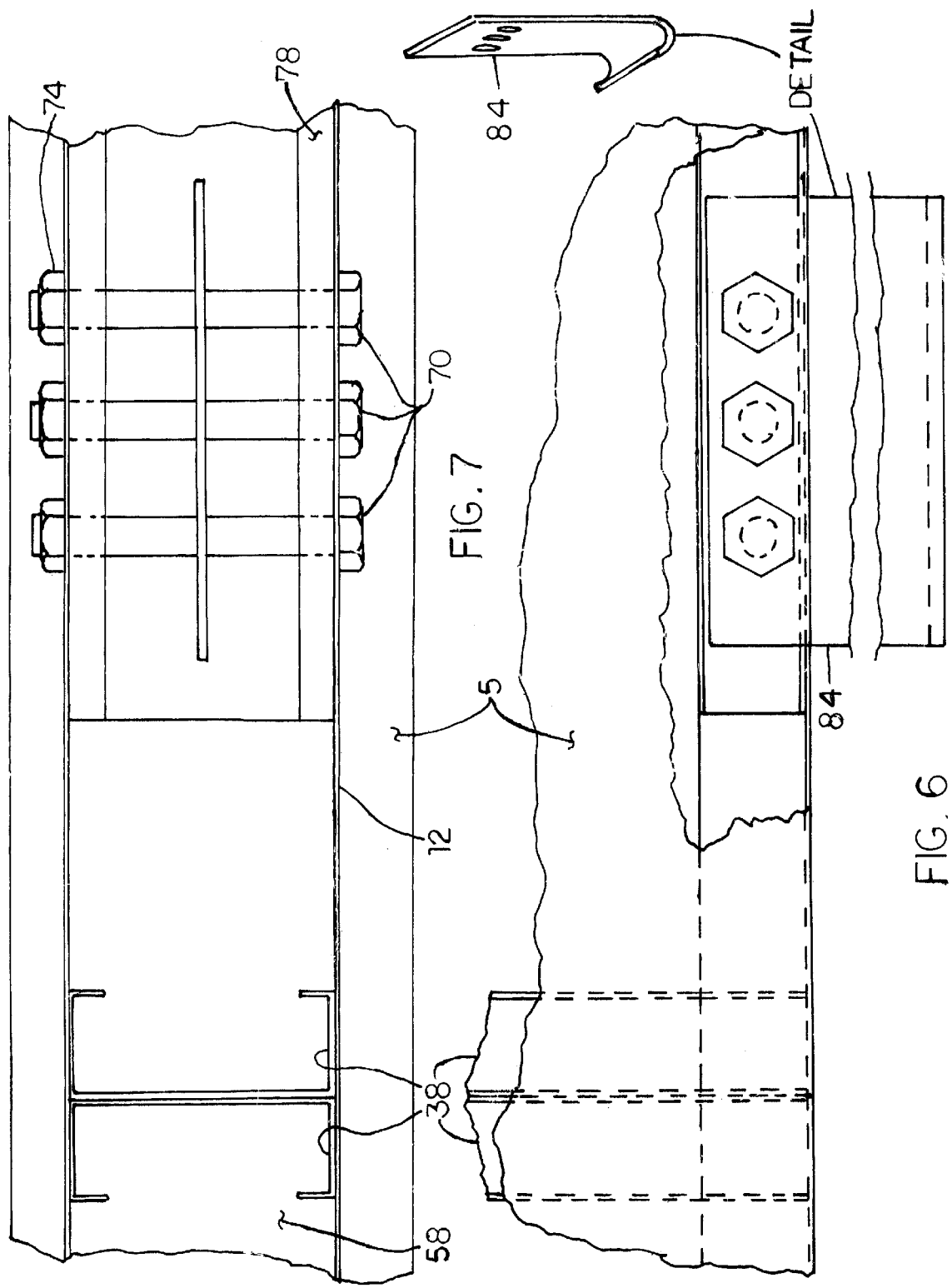

HOUSING PANELS, ENCAPSULATED, STEEL FRAMED

BACKGROUND—FIELD OF INVENTION

The object of the invention was to improve the fabricating procedure used in manufacturing prefabricated panelize housing panels. The inventor's objective was to produce superior panels, with a greater insulation "R" factor in a small amount of wall thickness space for the exterior wall and ceiling panels. He was also intent on increasing the strength of the exterior wall panels against earthquake and wind, to produce them easier, faster, easier field installation and at a lower cost.

BACKGROUND—DESCRIPTION OF PRIOR ART

The inventor was already producing a similar product with the use of open framed jig fixtures, which assembled the steel framed wall panels. After the framework was complete the drywall and electrical was installed, then the Polyurethane insulation was sprayed into the walls. The exterior siding was generally installed at the site. While his current process produced good quality at a lower cost it still did not satisfy the inventor. The most important part of housing panels is the exterior panels, walls and ceilings. They produce the envelope within which the resident lives. In order to obtain a higher "R" factor, above R-13, builders were forced to make thicker walls. Most builders, both factory and site builders, use Fiberglass insulation. Its "R" factor is much lower than that of Polyurethane foam spray. The high density Polyurethane foam spray used herein, has an "R" factor of 7.69 per inch of thickness, whereas fiberglass bats have an "R" factor of approximately 3.58 per inch of thickness. The inventor's present system has certain drawbacks which lowered the cost effectiveness of the current method.

This prompted the inventor to develop a procedure for producing the panels in a far superior manner. He designed and developed the Clamshell Jig Fixture. The Clamshell Jig Fixture is designed to improve all phases of production of the wall panels except the assembly of the framework.

SUMMARY

The Clamshell Jig Fixture solved all of the inventor's problems, including some he hadn't thought of, as relates to the production of a higher quality exterior housing panel.

OBJECTIVE AND ADVANTAGES

The objective is to produce exterior housing panels with a greater insulation "R" factor in the standard wall size of 3⅝ inches thick, more moisture resistant, fire resistant, termite and bug resistant, and with superior strength. The Clamshell Jig Fixture did just that. After the steel framework is completely assembled in an open squaring jig fixture, per applicable building code, the framework is placed into the Clamshell Jig Fixture. The Fixture is then closed tight. Then the Polyurethane Foam is injected into the Clamshell Jig Fixture from the top and other areas as needed. The Polyurethane foam expands as it is injected into the Clamshell, filling all areas except that which the steel occupies. The panel becomes what is known as an Encapsulated assembly. In addition to filling all the cavities of the wall panels, the framework is positioned with spacers, so that the foam places ½ inch to ⅝ inch of foam on the inside of the exterior walls and ¾ inch to 1" on the outside of the framework. This eliminates the need for drywall on the inside and sheathing on the outside. After the foam is cured, which take only minutes, the Encapsulated frame assembly is removed from the Clamshell Jig Fixture. The frame assembly is trimmed of excessive foam and readied for the prehung doors and window assemblies, if required. When a wall panel is to receive one or more door or window assemblies, a door or window filler block is installed into the Clamshell Jig Fixture prior to inserting the framework into the Clamshell. This filler block prevents foam from filling the door and/or window cavity while injecting the foam.

The Clamshell Jig Fixtures may be fabricated in any size, thickness or shape, height or length, depending upon the manufactures requirements. Ceiling panels are produced in the same manner similar to the wall panels. It is recommended that the panels be designed as 8 feet high, 8 feet long and using a steel framework of 3⅝ inches thick. This will result in a standard wall. This height and length are easier to handle. As a comparison, a wooden 3⅝ inch thick frame wall 8 feet high and 8 feet long, with ⅝ inch drywall on the inside, R-13 fiberglass insulation, and a ½ inch sheathing on the outside weighs approximately 1,163.53 pounds. A steel wall of the same size manufactured under the inventor's current system weighs approximately 496.62 pounds and the same size panel using the Clamshell Encapsulation process weighs approximately 346.77 pounds. This is approximately 70% less than a wood framed panel, and 30% less than the inventor's current system.

The difference in the amount of the "R" factor is much greater than that of wood. A 3⅝ inch thick steel framework with ⅝ inches of foam on the inside replacing the drywall and 1 inch of foam on the outside, produces an encapsulated 5¼ inch thick wall panel. This results in an "R" factor of 40.37 as compared to an R-13 in a standard wooden wall or an R-19 in a 6 inch thick wall.

The cost difference in comparison is as follows: Comparing identical "R" factor walls. A wooden wall panel of the size specified, 3⅝"×8'×8', costs approximately $15.22 per linear foot. A steel Encapsulated wall panel of the same size and with the same "R" factor costs $8.44 per linear foot. To achieve the "R" factor of the encapsulated wall assembly the wooden wall would cost approximately $47.33 per linear feet. This computes to a savings of approximately 68%.

The Polyurethane referred to herein is a Class 1 Isofoam Polyisocyanate. It is free from Formaldehyde and CFC's or HCFCS. It repels water and is self extinguishing. It has an "R" factor of 7.69 per square or cubic inch after curing. It has a compressive strength of 40 pounds per square or cubic inch. It readily bonds to drywall and steel and many other building products including wood. Because of the compression strength of the Polyurethane foam, it increased the structural integrity of the ceiling and wall panels. A 3⅝ inch steel frame assembly with a ⅝ inch inside foam sheath and a 1 inch outside foam sheath comprising a total wall thickness of 3⅝ inches, 8 feet tall and 8 feet long will occupy 48,384 cubic inches of foam insulation. The vertical strength of the encapsulated wall panel one inch long across the full thickness, 5¼ inches, of the wall panel 8 feet high, will provide a total compressive strength of 20,160 pounds, 96 inches×5¼ inches=504 cubic inches×40 lbs/sq. inch. The vertical strength of the entire 8 foot long encapsulated wall will produce a total compressive strength of 1,935,360 pounds, 96 inches×20,160. This does not include the vertical compressive strength of the steel stud members, which will vary from as small as 7,500 lbs per inch to 25,000 lbs per sq inch, depending upon the steel thickness. A wooden frame gains no strength from the fiberglass insulation bats, and the wooden studs have a compressive strength of 1,200 lbs per sq. inch. Thus the Polyurethane foam insulation greatly increases to the wall strength.

Advantages

1. The exterior housing panels, ceiling and wall, constructed using the Encapsulated method of fabrication will provide a much greater energy savings as compared to a standard wood frame panel system with fiberglass insulation. The encapsulated panels provide approximately a 311% greater insulating advantage.
2. Additionally, the Encapsulation process also prevents air infiltration through the electrical receptacles and switch boxes.
3. The ½ inch to ⅝ inch of foam insulation replacing the drywall on the inside of the Encapsulated wall panel enhances the insulating factor by as much as 7.69 times and the foam does not shatter as easily as drywall. The foam is also compatible with the use of joint plastering materials.
4. The transmission of outside cold or heat is virtually eliminated due to the Polyurethane foam providing a ¾ to 1 inch sheathing on the outside of the wall frame. This provides an "R" factor of an approximate minimum of 5.77 to 7.69 against cold or heat entering the housing envelope through the steel. Standard plywood sheathing provides a 0.5 "R" factor.
5. The panels are easier to manufacture using the Encapsulation method because it eliminates the drywall, including breakage losses, and the extra labor to install.
6. The Encapsulated panels are easier to handle in the factory and at the site during assembly or installation, due to the recommended smaller size and weight, including shipping.
7. The Encapsulated panels provide moisture resistance.
8. The Encapsulated panels provide fire resistance because the foam is self extinguishing and does not outgas.
9. The Encapsulated panels are superior in strength both vertically and horizontally against earthquake and winds.
10. The Encapsulated panels can be maintained as easily as drywalled panels.
11. The Encapsulated panels provide more flexibility in design.
12. The Encapsulated panels lower the cost of installation and requires less manufacturing space thus lowers overhead costs.

Comparisons Made to Other Patents

Reference is herein made to U.S. Pat. No. 5,499,482. This patent performs the function of Encapsulating, injecting a polyurethane foam into the walls of an "existing metal building". It does not establish the use of this patent technology for use on residential buildings, and stresses the use of a particular type of underpinning and attachment system to a foundation. The patent does not indicate how it develops openings for doors and windows, except for the attachment of an added door. U.S. Pat. No. 5,499,482 states that its design is for steel buildings, but it admits that the thermal conductivity and transmission of heat and cold into the building had not been a consideration in the patent design. This patent design could not be used for residential housing and some commercial housing units because it leaves the building above the ground or floor level. This unsealed space between the floor or foundation allows the temperature and environment to enter the inside of the building via the open space. It is also limited to small buildings which can be lifted in place by a crane. It claims to be able to be produced economically, but this method of construction for residential housing and some commercial units would be more costly than is presently used. The system would not meet most building codes in the U.S.A. A similar U.S. Pat. No. 6,035,584 produces a metal encased panel system with no interior structural members vertical or horrizontal. This includes wind and door opening headers and sills. Further, presumes to be usable for a foamed floor structure. Structurally it is not sound without horrizontal beams. This design is also deficient in the same way as the following Japanese patent.

The Japanese patent number 10-131348 which injects polyurethane foam into a framework jig produces a foamed panel with plywood or steel exterior surfaces. While the Japanese patent produces a polyurethane panel, it also has little or no structural value for use in the production of residential wall panel units since it has no horizontal or vertical members within the completed panels to support the doors and windows including header and sill supports. A polyurethane panel alone is not structurally sound enough to sustain the weight of a residential unit, which must support the entire roof structure, horizontal, vertical, wind and seismic loads. This is true even more so for a two or three story residential unit. The lack of headers and/or sill and vertical members are required in the production of any housing unit be they wood or steel. The use of an exterior plywood surface on the panels is subject to environmental deterioration and destruction from termites and wood boring beetles. Plywood made wet by moisture separates and becomes worthless as a support device. Further, if diagonal bracing is required, there is no way to attach such bracing to the Japanese polyurethane panel once the plywood has deteriorated. This patented panel would not meet building codes in the U.S.A.

A fourth U.S. Pat. No. 4,298,323 is a design for an apparatus for molding laminated foam-body panels. However, the design would be far too expensive for use in the production of prefabricated panelized housing panels. It gives no indication what the resulting panels would be. Further it indicates that the foam materials used in making the panels must be heated in the mold, which would increase the cost of the production of the panels themselves by the use of electrical energy within the mold. This patent does not appear to be a useful design which would be beneficial to housing panel production.

A fifth U.S. Pat. No. 5,667,192 is a design for constructing concrete molded panels. This is patent that would be useful for the production of housing panels. It might be useful for the production of tilt-up industrial buildings, but not residential and commercial housing units.

DESCRIPTION OF DRAWING FIGURES

In the drawings, closely related figures have the same number, but different alphabetic suffices.

FIG. 1A shown on sheet 1 of 4, is a pre-assembled steel framed panel 12, with a rough window opening 14, which could have been a rough door opening or others. The objective of the patent is not to attempt to patent the technology of assembling the steel framed panels. The objective of the patent is the Encapsulation of the pre-assembled steel frame panels, because it is a superior method of producing high quality exterior housing panels at a lower cost. This is only an example of a panel 12 type or style. There are many other combinations such as: One window; one door; two windows; two doors; one door and one window and no doors and no windows. All these styles or types are applicable to this encapsulation process. The size and shape of the Clamshell Jig Fixture FIG. 1B, is dependent upon the manufactures requirements and intended design parameters. This figure is designed to depict an 8 foot high by 8 foot long wall with a standard steel frame thickness of 3⅝ inches 12. The pre-assembled frame panel 12 is constructed of industry standard light gage galvanized steel studs and track, channel, generally 20 gage and stronger, to 12 gage. The Clamshell Jig Fixture must be made of a material such as steel that will resist the buckling pressures of the encapsulating foam. As the foam is injected into the Clamshell Jig Fixture the foam expands rapidly causing pressures in all directions. This pressure eliminates any bubbles and voids in the foam. FIG. 1A indicates that the pre-assembled steel framed panel is intended to be inserted into the Clamshell Jig Fixture.

FIG. 1B shows the design of a Clamshell Jig Fixture designed specifically for this method of fabrication using the encapsulation process. The Clamshell Jig Fixture sides 20 must be made deep enough to accommodate the thickness of the steel frame and the desired thickness of the inside and outside foam sheathing. The bottom 22 of the Clamshell Jig Fixture should also be made of a strong material such as steel. The Clamshell Jig Fixture cover 24 should also have sides 20 for strength, with a rubber sealing gasket. Holes 28 in the top of the Clanshell Jig Fixture and where ever else required are placed in the Clamshell Jig Fixture to allow the injection tubes to be inserted and excess to escape. Some holes are to be threaded so they may be plugged as needed, others are smooth. As the foam is being injected into the Clamshell Jig Fixture by the injection tubes, through the holes 28 the injection tubes are slowly being withdrawn from the. The cover must also have locking devices 30 adequately spaced to provide a good seal and prevent unwanted leakage of the foam. The cover 24 is hinged, in order to provide the matching of the bottom of the Clamshell Jig Fixture cavity and the top or cover. FIG. 1B also shows a window filler block insert 26. The insert 26, is placed in the Clamshell Jig Fixture before the pre-assembled frame 12 is to be placed into the Clamshell Jig Fixture. The insert 26 is designed to fill the door or window void so that the encapsulation materials do not enter into this space. Depending upon the design of the entire Clamshell Jig Fixture, the cover 24 may be required to have some type of restrainer 32, joining the base of the Clamshell Jig Fixture and the cover 24. Block filler inserts 26, must be made for each type and size of door and/or windows to be used during production of a particular model home. The inside surfaces and the inserts 26 must have a Teflon coating to prevent the Polyurethane foam from sticking to the Clamshell Jig Fixture and the inserts 26. The internal surfaces of the Clamshell Jig Fixture must be coated with either teflon or an equivalent material to prevent the Polyurethane foam from sticking to the jig fixture.

FIG. 2 shows frontal view of a typical encapsulated steel wall frame 12, with a door opening instead of a window. This figure is displayed for the purpose of showing how and where the foam 52 exists within the exterior housing panel after encapsulation. The vertical steel studs 38 are shown both solid, in cutout areas, and by invisible lines. The upper 40 and lower 58 steel channel, track, are typical installations. The 2 inch strap 50, on both sides, are standard. A steel header 42 is shown for a door opening. A lower header channel 44 and a head channel 48 are shown together with a steel cripple 46. A Cross Section A—A is shown to indicate where the inside of the finished wall, replacing the drywall, now contains ⅝ inches of foam 54, or ½ inch, and the one, 1, inch of foam 56 on the outside of the steel framed wall panel after encapsulation with Polyurethane foam 52. A typical End View of the panel is also shown to the left of the finished wall panel.

FIG. 3 shows the side of two wall panels being attached to one another by a special high strength attachment method. This is probably one of the many possible ways to join the encapsulated panels during installation in the field. This drawing shows a smaller stud 64, approximately 2 to 3 inches long, which may be spot welded in place. This stud 64 together with the main stud 38 is pre-drilled with a ½ inch relief hole through both sides of the main stud, the smaller stud and with a small "C" clip 68. Pre-drilling all three parts at the same time ensures perfect alignment. Connections of this nature with parts such as just described, should be installed approximately 3 inches above the bottom channel 58 of the steel pre-assembled panel 12, in all four corners of the frame assembly 12, and may also be installed at some other points on the end studs 38. In the field the panels are joined together by inserting the ½ inch diameter bolts 70 in through the "C" clips 68, the main studs 38 and the smaller stud 64, then applying self locking nuts 74. Teflon ½ inch diameter rods are placed in these holes during encapsulation.

FIG. 4 shows a end view or cross section of FIG. 3 as it would appear encapsulated and joined to another panel. It shows a clearer picture of the short pre-attached stud 64 and the bolt 70 and self locking nut 74 installed into vertical stud 38. It also shows how the "C" clib 68 joins the panels. Both FIGS. 3 and 4 show the upright flanges of the lower channel, track 58.

FIG. 5 provides a plan view cross section of FIG. 4, which more clearly shows the panels being attached.

FIG. 6 indicates the method of attaching the panels to a foundation due to the inaccessibility of the use of other anchoring methods in a concealed area. The lower channel 58 of a pre-assembled steel panel 12 shows two studs 38 from two separate completed panels. Prior to encapsulation, a piece of stud approximately 8 inch long 78 is installed into the lower channel 58, attached by spot weld. Next, three ½ inch through holes are drilled through both sides of the channel 58 and the stud 78 at the desired location, approximately in the center of the parts horizontally. This assembly is for the purpose of accepting a 12 gage, 0.109 thick clip 84 shown in detail. The clip 84 is approximately six, 6, inches wide and approximately 8 to 9 inches long. It has three, 3½ inch relief holes pre-drilled in it equally spaced 1½ inches apart, to accept ½ inch bolts 70 and nuts 74. This anchor clip 84 is buried in the cement of the foundation of the home and is intended to accept the encapsulated panels via slots in the lower channel 58 and the attached stud 78. The clip 84 is suppose to be anchored in the cement so that it sticks up through the surface of the cement enough to allow the three ½ inch bolts 70 to be inserted.

FIG. 7 is a plan view cross section of figure six, 6, which is intended to show the method of attaching the encapsulated panels to the foundation using the clip 84, the three bolts 70 and the three lock nuts 74, using this encapsulated panel method of producing low cost high quality housing panels. The retention strength of a ½ inch diameter bolt is a approximately 30,000 pounds in shear. The retention strength of the connections between panels shown in FIG. 3 is approximately 2,830 pounds per connection. The retention strength of the connection at clip 84 in FIG. 4 is approximately 16,350 pounds per plate connection.

DRAWING REFERENCE NUMERALS
WORKSHEET

FIG. 1A
12 Typical pre-assembled steel framed panel.
14 Rough window opening.
FIG. 1B
18 Clamshell Jig Fixture
20 Cavity sides
22 Cavity bottom
24 Hinged cavity cover
26 Window (or door) filler block
28 Holes for injecting plastic foam.
30 Clamshell Jig Fixture locks
32 Cover restraining device
FIG. 2—Typical View of an Encapsulated Panel
38 Steel studs
40 Steel upper channel
42 Steel header
44 Lower header channel
46 Steel cripple
48 Steel head channel
50 2 Inch steel staps
52 Polyurethane foam
54 Inside of finished panel
56 Exterior of finished panel
58 Lower steel channel
FIG. 3—Suggested Joining of Two Adjacent Exterior Panels
64 Smaller short stud piece 16 gage, spot welded in place.
68 Pre-drilled "C" clip, 16 gage.
70 ½ Inch diameter bolts
74 ½ Inch nuts
FIG. 4—Panel Anchoring Device, Hidden
78 8 Inch long stud (same web as others)
80 ⅛ Inch wide by 6½ inch long slot in lower channel.
84 Clip, pre-drilled for 3 half inch bolts spaced ½ inch apart.

What is claimed and desired to be secured by letters of Patent is as follows:

1. A method of encapsulating single open frame light gage steel panels, which comprise the following steps:
    (a) Taking a pre-fabricated, pre-assembled, light gage steel framework panel, that meets applicable structural building codes, with pre-installed electrical components, raceway and outlet boxes, and basic plumbing requirements;
    (b) Placing the pre-fabricated steel framework into a predesigned Clamshell Jig Fixture;
    (c) Positioning the framework in such a way as to allow for a ⅝ inch gap on one side of the panel and 1.00 inch gap on the other side of the panel, using selected spacers;
    (d) Installing into the jig fixture a door or window filler if required in the panel design;
    (e) Installing teflon attaching hardware fillers;
    (f) Closing the Clamshell which is self sealing;
    (g) Inserting a polyurethane injection wand from a injection machine, into the closed Clamshell in the required injection hole openings;
    (h) Turning on the injection machine and injecting the two part foam into the Clamshell, filling all the vacant or open internal areas with the foam;
    (i) After the polyurethane foam is cured, approximately 3 to 5 minutes, remove the encapsulated panel from the Clamshell;
    (j) Last, trimming off any amounts of excess foam from the panel, which is a finished polyurethane foam panel.

2. A method of claim 1, wherein the polyurethane foamed panel, provides an insulation factor of approximately R-40, which is over 300 times greater than the standard of R-13 fiberglass insulation and is free from Formaldehyde and CFC's or HCFCS.

3. A method of claim 1, wherein the production of a ⅝ inch thick foam panel on an outer surface of the foamed panel, which faces to the inside of a housing unit, provides an internal insulation barrier and this internal ⅝ inch foam panel also eliminates the use of a drywall panel inside;
    (a) The production of 1.00 inch thick foamed panel on an outer surface of the foam panel which faces to the outside of a housing unit, prevents external environments from entering the inside of a housing unit;
    (b) The external 1.00 inch foam panel preserves the R-40 insulation factor of the total panel.

4. A method of claim 1, whereas the finished polyurethane foam panel is moisture resistant to an outside environment.

5. A method of claim 1, the finished polyurethane foam panel is more fire resistant.

6. A method of claim 1, whereas the horizontal, vertical, wind and seismic load strengths of the finished polyurethane foam panel far exceeds all United States Building codes.

7. A method of claim 1, whereas the finished panels are lighter and easier for shipping and installation than a wood frame of the same size.

8. A method of claim 1, whereas it produces pre-insulated pre-fabricated panels in a factory easier, faster, which costs less in labor and processing than any other type of pre-fabricated panel system.

9. A method of claim 1, whereas this new technology provides greater flexibility in design, easier and faster field installation since doors, windows, electrical and basic plumbing requirements are pre-installed in a factory.

10. A method of claim 1, whereas a housing panel fully encapsulated with polyurethane foam with electrical boxes and raceways prevents the infiltration of air through the receptacles and switch boxes.

* * * * *